United States Patent [19]

Duchamp et al.

[11] Patent Number: 4,651,638
[45] Date of Patent: Mar. 24, 1987

[54] PRESS HAVING AN ANNULAR INFLATABLE CHAMBER

[75] Inventors: Robert Duchamp, Montpellier; Roland Plever, St-Quentin; Patrick Truchot, Champs-sur-Marne, all of France

[73] Assignee: Societe d'Etudes et de Recherches de l'Ecole Nationale Superieure d'Arts et Metiers (S.E.R.A.M), France

[21] Appl. No.: 787,033

[22] Filed: Oct. 15, 1985

[30] Foreign Application Priority Data

Oct. 23, 1984 [FR] France .................. 84 16191

[51] Int. Cl.⁴ ............................. B30B 5/02
[52] U.S. Cl. ................................ 100/211
[58] Field of Search ............ 100/211; 264/314; 249/65

[56] References Cited

U.S. PATENT DOCUMENTS

| 2,724,508 | 11/1955 | Luther | 100/122 |
| 3,080,609 | 3/1963 | Gerard | 100/211 X |
| 3,269,157 | 8/1966 | Ashley | 100/211 X |
| 4,370,120 | 1/1983 | Foster et al. | |

FOREIGN PATENT DOCUMENTS

| 666463 | 10/1938 | Fed. Rep. of Germany . | |
| 1013517 | 8/1957 | Fed. Rep. of Germany | 100/211 |
| 1093396 | 5/1955 | France . | |
| 1158313 | 6/1958 | France . | |
| 1189674 | 10/1959 | France | 100/211 |
| 8307451 | 5/1983 | France . | |
| 2545416 | 11/1984 | France . | |

Primary Examiner—Billy J. Wilhite
Attorney, Agent, or Firm—Gerald J. Ferguson, Jr.; Ronni S. Malamud; Michael P. Hoffman

[57] ABSTRACT

An inflatable chamber (2) is placed inside an outer support body (1), and the outer wall (3) of the inflatable chamber is pressed against the inside wall of the support body by plates (9) and draw bars (10), in such a manner that the inside wall (4) has substantially the same diameter (DGO) when the chamber (2) is under atmospheric pressure and when the chamber is under its maximum pressure for compressing the body against which the inside wall (4) is pressed.

5 Claims, 4 Drawing Figures

PRESS HAVING AN ANNULAR INFLATABLE CHAMBER

The invention relates to a press having an annular inflatable chamber contained in a rigid outer tubular body and intended to apply essentially radial pressure along its entire length on any body which may be inserted in the central space which is surrounded by the annular inflatable chamber when in the deflated state.

BACKGROUND OF THE INVENTION

Presses of this type are already known in which the inflatable chamber is made of an elastically stretchable material, e.g. an elastomer, in the form of a cylindrical sleeve which is deflated so that it is retracted prior to inserting a body to be compressed and which is then inflated so as to cause the chamber to expand, thereby compressing the body. The inside annular wall of the inflatable chamber is in direct contact with the body to be compressed.

During a compression operation it is common for the outer diameter of the compressed body to reduce. In other words, the higher the pressure inside the inflatable chamber, the further the compressed body shrinks in diameter and the further the inside annular wall of the inflatable chamber must correspondingly reduce its circumferential or perimetric length to enable it to follow the change in size of the compressed body against which it is thrust by the pressure.

In practice, the inside annular wall adapts to the reduction in the diameter of the compressed body by forming numerous folds whose size increases progressively as the compression increases.

These folds are a cause of weakness and of rapid deterioration in the material which constitutes the inflatable chamber. It is observed that an important compression effect is exerted on the material at the bottoms of the folds, and that this may lead to rupture of the material due to a crushing effect. In contrast, the sides of the folds, particularly in the proximity of the compressed body, are stretched, and the extension frequently exceeds 50% and may even be greater than the elastic limit of elastomers (400% to 500%). Further, at these folds which grow constantly in size during compression, the pressure stress exerted on the compressed body is not equal to the pressure stress exerted thereon at those zones of the chamber wall which are pressed flat against the compressed body.

Preferred embodiments of the invention provide a press having an annular inflatable chamber made of elastomer and having an annular inside wall which is applied under pressure against a body to be compressed and which does not form folds as the size of the compressed body is reduced due to the pressure.

SUMMARY OF THE INVENTION

The present invention provides a press having a rigid outer tubular support body, and an annular inflatable elastomer chamber having an outer wall capable of being applied against said support body and an inner wall for application against a body to be compressed, the inflatable chamber being such that when its outer wall is applied substantially against the inside face of the tubular support body and the pressure in the chamber is at the maximum compression pressure for compressing a body against which the inside wall of the chamber is applied, then the inside wall has a perimeter in right cross-section which lies in the range 1 to 0.85 times the perimeter of the same right cross-section when the pressure in the inflatable chamber is substantially equal to the pressure of the surrounding medium.

In order to facilitate explanation, the body to be compressed is assumed to be at least approximately cylindrical having a diameter prior to compression reference DO and a diameter at the end of compression referenced DP, the inside diameter DGO of the inflatable chamber when in free communication with the atmosphere becomes, at the end of compression, equal to a value lying between DGO and 0.850 DGO. It is preferable to adopt a value equal to about 0.90 DP.

It is also preferable for the outer wall of the inflatable chamber to be held permanently pressed against the rigid outer support body by fixed connection means. Thus, if the chamber is evacuated, its inner wall is brought to press against its outer wall. The inflatable chamber then has a radial thickness which may be estimated to be 20 mm at most, given the thickness of each of the two superposed walls and the thickness of the connection means (which varies considerably depending on their nature). In this state, when the chamber is emptied of air, the inside diameter of the chamber DGV is greater than the outer diameter DO of the body to be compressed in order to leave radial clearance to facilitate insertion of said body into the chamber when it has no air inside. However, the clearance should be as small as possible in order to minimize the dead stroke of the inside wall of the chamber prior to making contact with the body to be compressed. In general, the relationship between the inside diameter of the chamber when evacuated and the outside diameter of the body to be compressed should be given by DGV=1.015 to 1.035 DO.

The body to be compressed cannot be compressed down to zero diameter. Numerous observations have shown that in most cases the diameter DP at the end of compression is equal to about 80% of the diameter DO prior to compression.

It thus follows that the diameter of the inside wall of the inflatable chamber varies between the value DGV when it is evacuated (equal to not more than 1.035 DO) and DGO at the end of compression which is equal to DP or not less than 0.85 DP, giving a minimum of 0.85×0.80 DO (since DP=0.80 DO), i.e. 0.68 DO.

Further, since the diameter of the inside wall at the end of compression is identical to its diameter in the absence of pressure or vacuum inside the chamber, it is observed that this inside wall is extended between the value DGV=0.80 DO and the value 1.035 DO under the combined effect of the connection means which act on the outer wall of the chamber and the reduced pressure set up therein prior to inserting a body to be compressed. This elongation can readily be verified as being about 30%. It is generally considered that an elastomer behaves satisfactorily when its elongation is not more than 50%.

Consequently, a press made using fixed connection means which hold the outer wall of the chamber permanently pressed against the outer support body satisfies all the conditions necessary to providing regular and uniform compression on the compressed body, without forming folds and without excessive elongation of the inside wall of the inflatable chamber.

In addition, it is preferable for the outer wall of the chamber to be in an elongated state when it is held pressed against the outer support body.

Any suitable means which conserve airtightness of the chamber and which do not apply excessive stresses on its outer wall may be used as connection means between the outer wall of the inflatable chamber and the fixed outer support body. For example, the connection may be chemical in nature by causing the elastomer to adhere to the surface of the support body, which body is preferably made of metal. The connection may alternatively be mechanical in nature being provided by plane parts fixed to the outer wall of the chamber and to the support body.

In one embodiment of the invention a plurality of successive plates are mounted in a spaced apart configuration inside the chamber, said plates being elongate in the axial direction of the chamber; each of these plates is fixed to at least one radial rod which passes through the outer wall of the chamber in airtight manner and which passes freely through a corresponding hole in the outer support body. Outside the support body, each radial rod is provided with traction and a locking means, for example a nut, serving to draw the corresponding plate towards the support body until said plate holds the outer wall of the chamber firmly applied against the inside surface of the support body.

Preferably, each plate is transversly curved to a radius of curvature which is equal to or greater than the radius of curvature of the inside surface of the support body in order to ensure that the outer wall of the chamber is properly applied against the support body.

BRIEF DESCRIPTION OF THE DRAWINGS

A preferred embodiment of the invention is described by way of example with reference to the accompanying drawings, in which.

DESCRIPTION OF PREFERRED EMBODIMENT

Figure 1:
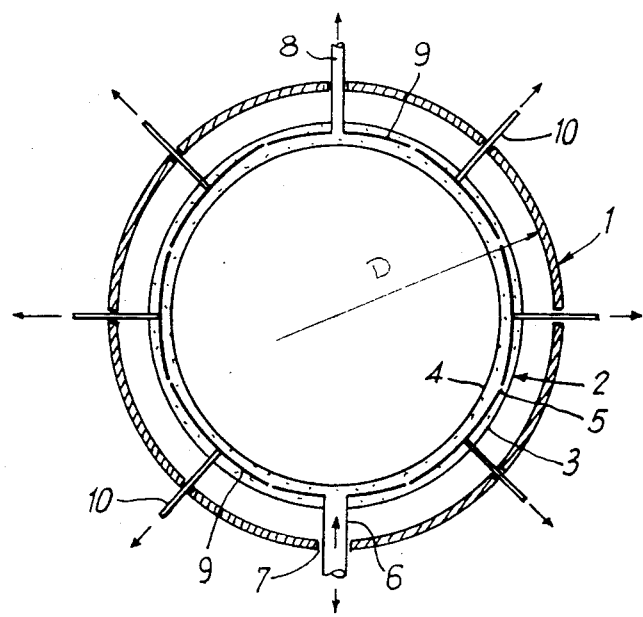
FIG. 1 is a diagrammatic section in a transverse plane through a press in accordance with the invention, the press being shown prior to establishing the connection between the inflatable chamber and the outer support body.
Figure 4:
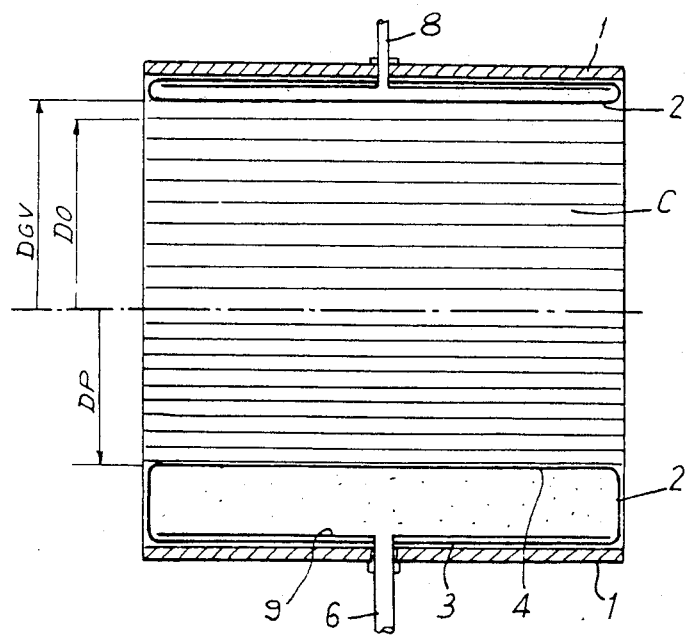

A press in accordance with the invention comprises a rigid tubular outer support body 1 which, when the body to be compressed is cylindrical, has the configuration of a cylinder of inside diameter D. Inside this support body 1 there is an inflatable chamber 2 made of resilient material of the elastomer type (natural or synthetic rubber, polyurethane, silicone, . . .). In its free state, the chamber 2 has the general appearance of a cylindrical annular sleeve with an outer cylindrical wall 3 and an inner cylindrical wall 4 as can be seen in FIG. 1. Its diameter is less than the inside diameter D of the outer support body 1. The outer support body 1 and the chamber 2 are of substantially the same length as a body C to be compressed, as can be seen in FIG. 4. The inside volume 5 of the chamber 2 is put into communication with the outside to enable it to be inflated and deflated by means of a lower pipe 6 which passes through the support body 1 via a corresponding opening 7. The pipe 6 would suffice if the chamber 2 were to be used with a gas under pressure. However, for safety reasons, it is preferable to inflate the chamber 2 by means of a liquid under pressure, in which case an air vent pipe 8 is provided at the top of the chamber. The air vent pipe 8 also passes through the support body 1.

A circumferential succession of plates 9 is disposed in the inside volume 5 of the chamber 2, and each plate 9 extends over the entire length of the chamber 2. The number of plates 9 depends on the diameter of the chamber: in practice an extent of 100 mm in the circumferential direction is suitable. The middle of each plate 9 is provided with a draw rod 10 which passes in sealed manner through the outer wall 3 of the chamber 2 and which also passes, but this time freely, through a corresponding hole 11 of suitable size through the outer support body 1. Each draw rod 10 is threaded, and by screwing a nut 10a thereon which bears against the outer face of the support body 1, a controllable amount of traction may be exerted on the rod 10.

The bottom pipe 6 and the top vent pipe 8 may each be fixed to a corresponding plate 9 inside the chamber 2 and thus act as a rod 10; these pipes are mounted in the same manner as the valve body which passes through the metal rim of a bicycle wheel and which is connected to the inner tube thereof.

When the plates 9 are very long or are insufficiently rigid, a plurality of draw rods 10 may be provided on each plate, said rods being spaced apart in the longitudinal direction and also in the circumferential direction.

Figure 2:
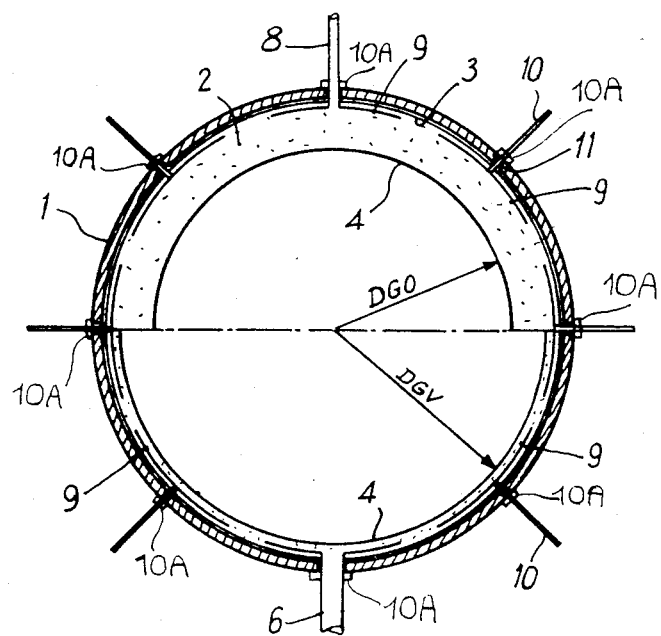
FIG. 2 is a similar view to FIG. 1 after the connection between the inflatable chamber and the outer support body has been effected, and the top half of the figure shows the chamber when containing air at approximately atmospheric pressure and the bottom half of the figure shows the chamber when evacuated.

In the free state (FIG. 1), the chamber 2 is radially distant from the outer support body 1. The plates 9 are then preferably in contact with one another in the circumferential direction. When traction is applied to the rods 10 in the outward direction relative to the chamber 2 and the support body 1, the plates 9 draw the outer wall 3 of the chamber 2 and hold it pressed against the inside face of the support body 1 (FIG. 2). The outer wall 3 is elongated circumferentially, and the plates 9 move apart from one another since they are now disposed around a longer circumference. The plates 9 must be sufficiently rigid to press the outer wall 3 against the support body 1 uniformly over their entire area. They may be made of metal (ordinary steel, stainless steel, aluminum . . .) or of plastics material.

So long as the chamber 2 is in free communication with the outside, the inside wall 4 is subjected to minimal circumferential elongation, if any, and thus has an inside diameter DGO.

This is the state of a press in accordance with the invention when it is ready for use: the outside wall 3 of the chamber 2 is continuously pressed against the inside face of the rigid outer support body 1. As mentioned above, the plates 9 and the draw rods 10 are merely one example of mechanical connection means which could be replaced by equivalent means.

Figure 3:
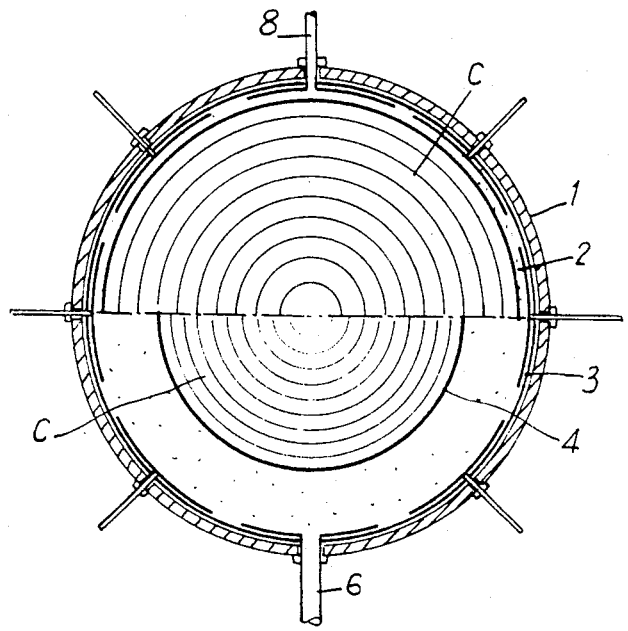
FIGS. 3 and 4 are views of the same press in transverse and longitudinal section respectively together with a body shown inside the inflatable chamber, the top half of each figure shows the press prior to compression and the bottom half shows the press in compression.

The dimensions of the press, and in particular the diameter of the chamber 2 and the diameter of the support body 1 are determined as a function of the diameter of the body to be compressed. Supposing that the body to be compressed has a diameter DO prior to compression (see the upper half of FIGS. 3 and 4) and a diameter DP at the end of compression (see the bottom halves of said figures), the chamber 2 should, when air is evacuated therefrom, have an inside diameter DGV (see bottom half of FIG. 2) which allows the body C to be compressed to be easily inserted. In practice, DGV should lie in the range 1.015 DO to 1.035 DO, e.g. it should be 1.020 DO.

When the body to be compressed C has been placed inside the evacuated chamber 2 (top halves of FIGS. 3 and 4) the chamber is inflated by means of a liquid under pressure up to some maximum pressure value (50 bars in the present example). The diameter of the body C is reduced to a value DP which is also the diameter of the inside wall 4 of the chamber 2 (bottom halves of FIGS. 3 and 4).

In this state of total compression of the body C, the inside wall 4 must have returned substantially to its free diameter DGO as shown in FIG. 2. However, this inside wall may take up a diameter at the end of compressing the body C which is less than DGO; for example it may have a diameter DP which is equal to about 0.85 DGO. This is because the excess which is equal to about 0.85 DGO. This is because the excess length of the inside wall 4 in the circumferential direction is absorbed to some extent (up to a limit given by said relationship) by the elongation which the pressure applies to the chamber 2 in the longitudinal direction. Any further reduction in the diameter DP at the end of compression relative to the diameter DGO in the free state of the inside wall 4 runs the risk of forming folds which it is desirable to avoid.

The inside diameter D of the outer support body 1 can be deduced from the above, taking account of the fact that the elongation of the outer wall 3 under the effect of the connection means 9, 10 must not exceed the elongation which the resilient material of the chamber 2 is capable of withstanding.

A press in accordance with the invention may be used for compressing bodies which are other than cylindrical: any body may be compressed so long as it is possible to make an inflatable chamber 2 having an inside wall 4 which takes up a shape similar to the shape of the outside face of the body to be compressed when the inflatable chamber is in its free state. In this more general state, the reference dimension is no longer the diameter, but rather the perimeter P of the right cross-section. It is then necessary to ensure that the inside wall of the inflatable chamber has a right cross-section of perimeter P in the free state such that its perimeter at the end of inflation lies in the range P to 0.85 P.

One particular use of a press in accordance with the invention is to compress agricultural material which has been divided into thin layers which are separated by sheets, as described in published French patent application No. 83 07451, for the purpose of dehydrating said material (alfalfa, beet pulp, brewers' draff, . . .) to achieve more than 50% dry matter with minimal energy consumption.

We claim:

1. A press for use in a surrounding medium and compressing a body to be compressed, said press comprising a rigid outer tubular support body having an inside face; an annular inflatable chamber having an outer wall and an inside wall, said chamber being lodged inside said tubular support body with its said outer wall applied over a substantial portion of its area against said inside face of said support body, wherein when said chamber is inflated to a pressure equal to the maximum inflation pressure with its said inside wall applied against a body for compressing said body to its state of maximum compression, then the perimeter of the right cross-section of said inside wall lies between 1 and 0.85 times the perimeter of the same right cross-section when the pressure inside said chamber is substantially equal to the pressure of said surrounding medium.

2. A press according to claim 1, including fixed connection means which hold the outer wall of the inflatable chamber pressed against the outer support body at any value of pressure or reduced pressure inside said chamber.

3. A press according to claim 2, wherein the outer wall is held pressed against the outer support body with its perimeter permanently elongated.

4. A press according to claim 2, wherein the connection means comprise plates disposed inside the chamber and extending along the length thereof and succeeding one another around the perimeter, each plate being provided with at least one draw rod which passes in sealed manner through the outer wall, which passes freely through the support body, and which is provided outside the support body with traction and locking means by which the outer wall is held pressed by the plates against the outer support body.

5. A press according to claim 4, wherein the inflatable chamber is provided with an inflating and deflating pipe and with an air vent pipe, wherein each of said pipes is provided inside the chamber with a plate and acts as a draw rod.

* * * * *